(12) United States Patent
Ezell et al.

(10) Patent No.: US 10,110,682 B2
(45) Date of Patent: Oct. 23, 2018

(54) SUPPORTING INTERMEDIATE BACK TO BACK USER AGENTS BETWEEN USER AGENTS AND A CONFERENCE FOCUS

(75) Inventors: Joel Ezell, Broomfield, CO (US); Frank Boyle, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 745 days.

(21) Appl. No.: 13/429,074

(22) Filed: Mar. 23, 2012

(65) Prior Publication Data
US 2013/0254302 A1 Sep. 26, 2013

(51) Int. Cl.
*G06F 15/16* (2006.01)
*H04L 29/08* (2006.01)

(52) U.S. Cl.
CPC .................. *H04L 67/141* (2013.01)

(58) Field of Classification Search
CPC ........... H04L 29/06027; H04L 65/1006; H04L 65/1016; H04L 65/1069; H04L 51/38; H04L 65/1009; H04L 63/08; H04L 63/083; H04L 63/0428; H04L 2463/102; H04L 63/18; H04L 65/105; H04L 65/1063; H04L 65/1073; H04L 67/02; H04L 65/80; H04L 65/104; H04W 12/06; G06F 17/2247; G06F 17/24; G06F 17/30017; G06F 17/30861; G06F 11/1402; G06F 11/1415; G06F 9/5072; G06F 9/541
USPC ....... 709/203, 204, 212, 213, 216, 217, 218, 709/225, 238
See application file for complete search history.

(56) References Cited

U.S. PATENT DOCUMENTS

| | | | |
|---|---|---|---|
| 2004/0028080 A1* | 2/2004 | Samarasinghe et al. ..... 370/486 |
| 2004/0190702 A1* | 9/2004 | Mayer ................... H04M 7/123 379/202.01 |
| 2005/0220039 A1* | 10/2005 | Hoshino et al. ............. 370/261 |
| 2008/0084874 A1* | 4/2008 | Ganesan ................ H04L 12/66 370/356 |
| 2008/0159503 A1* | 7/2008 | Helbling .............. H04M 3/565 379/142.17 |
| 2009/0135743 A1* | 5/2009 | Kowalewski ........... H04M 3/56 370/261 |
| 2009/0168986 A1* | 7/2009 | Jackson et al. .......... 379/211.01 |
| 2010/0098069 A1* | 4/2010 | Samarasinghe ............... 370/352 |
| 2010/0215037 A1* | 8/2010 | Long ................... H04L 65/1063 370/352 |
| 2011/0314166 A1* | 12/2011 | Axell ................ H04L 29/12594 709/227 |

(Continued)

OTHER PUBLICATIONS

IETF, Network Working Group, RFC 4579, http://tools.ietf.org/html/rfc4579.

(Continued)

*Primary Examiner* — Dustin Nguyen
*Assistant Examiner* — Thao Duong
(74) *Attorney, Agent, or Firm* — Sheridan Ross P.C.

(57) ABSTRACT

A communication system, method, and components are described. Specifically, a communication system having one or more Back-to-Back User Agents (B2BUAs) therein is described. The communication system also includes an RFC 4579 conference focus. Mechanisms are described which enable User Agents (UAs) to subscribe to conference state events and create ad-hoc conferences even though the conference focus is operating in a B2BUA environment.

20 Claims, 4 Drawing Sheets

(56) References Cited

U.S. PATENT DOCUMENTS

2013/0173812 A1* 7/2013 Ezell et al. .................. 709/228

OTHER PUBLICATIONS

IETF, Network Working Group, RFC 3261, http://www.ietf.org/rfc/rfc3261.txt.
IETF, Sipping Working Group, Best Current Practice/Transparent B2BUAs, http://tools.ietf.org/html/draft-marjou-sipping-b2bua-01.
U.S. Appl. No. 12/119,352 (This is a non-published application and will not be submitted with this form).

* cited by examiner

SUPPORTING INTERMEDIATE BACK TO BACK USER AGENTS BETWEEN USER AGENTS AND A CONFERENCE FOCUS

FIELD OF THE DISCLOSURE

The present disclosure is generally directed toward communications and more specifically toward multi-party communications.

BACKGROUND

A Session Initiation Protocol (SIP) Uniform Resource Identifier (URI) is the SIP addressing schema to call another person via SIP. In other words, a SIP URI is a user's SIP phone number. The SIP URI resembles an e-mail address and is written in the following format: SIP URI=sip:x@y:Port, where x=Username and y=host (domain or IP). The SIP URI standard has been defined in the RFC 3261 standard, the entire contents of which are hereby incorporated herein by reference.

When SIP Back to Back User Agents (B2BUAs) exist between a conference participant User Agent (UA) and a conference focus that is being operated in accordance with RFC 4579, the entire contents of which are hereby incorporated herein by reference, problems can occur. Specifically, conference participants should be able to SUBSCRIBE for conference state events and REFER other UAs to join the conference. Both of these messages use the Contact URI of the conference focus (e.g., conference server, conference bridge, mixer location, etc.) to identify the exact focus of the conference call.

B2BUAs situated between the conference focus and the UA in the signaling path, however, will have changed this Contact URI. The issue then revolves around the question of how to enable SUBSCRIBE/REFER to the conference focus when intermediate B2BUAs have changed the Contact URI of the conference focus. If the problem is not addressed, SIP UAs and conference bridges that are in complete alignment with the standards defined in RFC 3261 and RFC 4579 will simply not be able to create ad-hoc conferences or subscribe to conference state events in a B2BUA environment.

SUMMARY

It is with respect to the above issues and other problems that the embodiments presented herein were contemplated. In particular, embodiments of the present disclosure propose the ability to support intermediate B2BUAs between UAs and a conference focus that is in compliance with RFC 4579. In particular, methods, systems, and devices are proposed for this purpose.

In some embodiments, a contact header of a SIP message may contain a Contact URI as well as parameters. The parameters of a SIP message may be split into header parameters and URI parameters. In some embodiments, when a B2BUA receives a message with a contact header that contains a predetermined flag or value in either the header parameter or URI parameter (e.g., a message containing an "isfocus parameter"), the B2BUA will take the current Contact URI and embed it in an "originalFocusURI" parameter of the contact header. This parameter is then put into the new B2BUA Contact URI as a URI parameter. Meanwhile, the isfocus parameter can be preserved as a header parameter.

Continuing the above example, since the originalFocusURI parameter was a URI parameter, it will be included in the remote target URI that is stored by the conference participant UA. The UA would, therefore, be enabled to include the originalFocusURI parameter in any SUBSCRIBE or REFER message that it sends.

Furthermore, when a B2BUA sees an out-of-dialog SUBSCRIBE or INVITE that is addressed to itself with an originalFocusURI parameter, the B2BUA will "promote" or "un-nest" the originalFocusURI to be the new Request URI and will send the INVITE along to that URI. In some embodiments, the B2BUA can proxy the message without doing a Record-Route so it will not need to see any further in-dialog requests (such as NOTIFY).

It should be appreciated that instead of nesting the originalFocusURI parameters, a B2BUA could note the presence of an existing originalFocusURI and simply propagate that parameter to the next communication component (e.g., next B2BUA, conference focus, UA, etc.) without altering the originalFocusURI.

The features described above can allow B2BUAs to gain all of the benefits of changing the Contact URI while working with standard UAs that are unaware of the presence of the B2BUA or any non-standard headers.

In accordance with at least some embodiments of the present disclosure, a method is provided which generally comprises:
  receiving a first message;
  determining that the first message is associated with a conference focus;
  in response to determining that the first message is associated with a conference focus, extracting a first Contact URI from the first message; and
  generating a second message that contains the first Contact URI embedded as a contact URI parameter of the second message.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
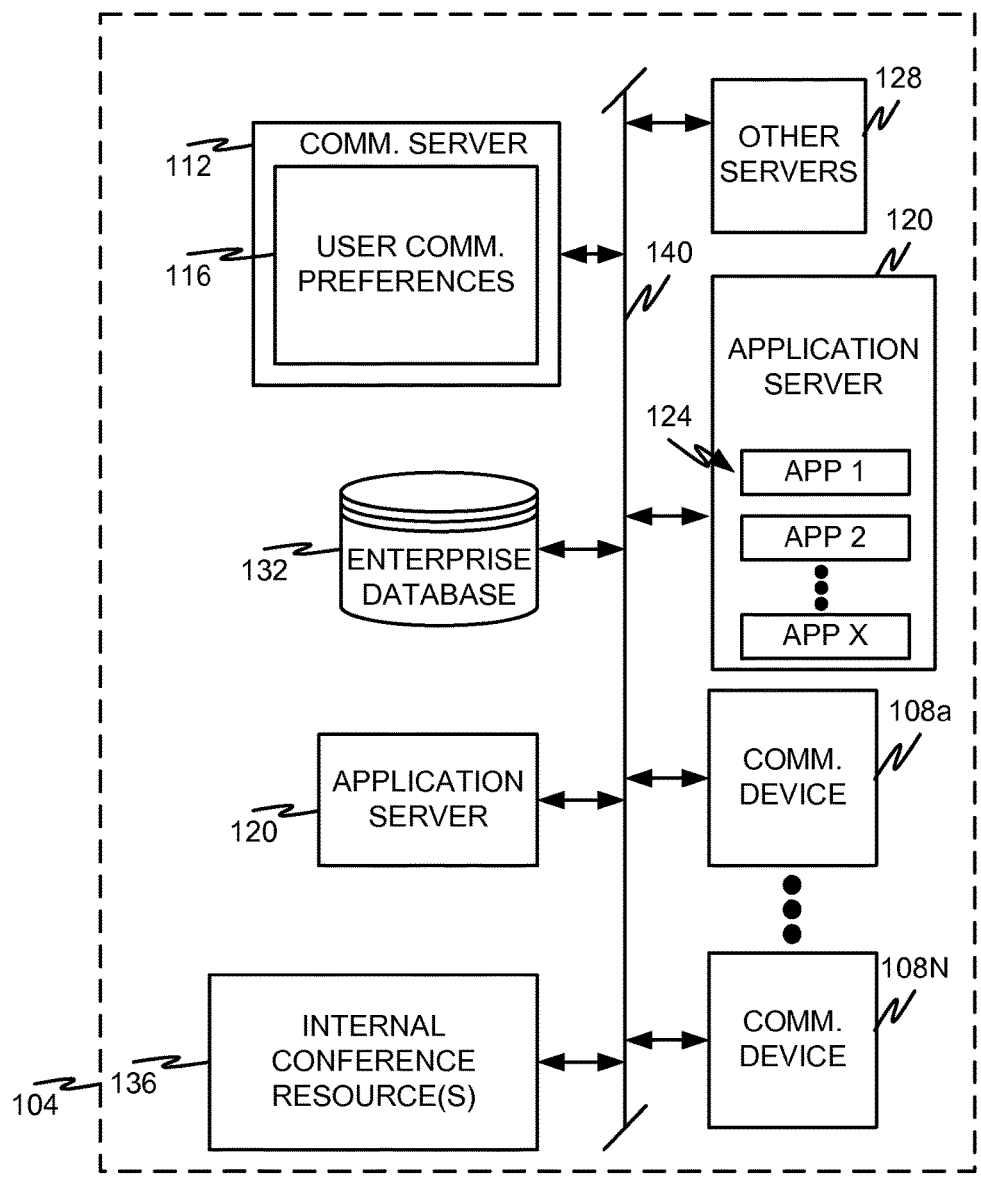
FIG. 1 is a block diagram of a first communication system in accordance with embodiments of the present disclosure.

The communication system depicted in FIG. 1 may include an enterprise network 104 that is either a single-location enterprise network or a multi-location enterprise network. A single-location enterprise network may comprise a network backbone 140 that corresponds to a Local Area Network (LAN) that includes wired and/or wireless technologies. A multi-location enterprise network may comprise a network backbone 140 that is a Wide Area Network (WAN), which connects a plurality of LANs or similar network locations via one or more untrusted networks (e.g., the Internet, a cellular network, an IMS network, an ISDN network, a PSTN, etc.).

Additional components of the enterprise network 104 include, without limitation, a plurality of communication devices 108a-N, a communication server 112, one or more application servers 120, other servers 128, an enterprise database 132, and one or more internal conference resources 136.

The communication devices 108a-N may correspond to user communication devices and, in some embodiments, may correspond to a UA or multiple UAs of enterprise users. Examples of communication devices 108a-N include, without limitation, a telephone, a softphone, a cellular phone, a multi-speaker communication device (e.g., conference phone), a video phone, a Personal Computer (PC), a laptop, a tablet, a Personal Digital Assistant (PDA), a smartphone, a thin client, or the like. It should be appreciated that a communication device 108 may be configured to support single or multi-user interactions with other communication devices 108 within the enterprise network 104 as well as other communication devices that are external to the enterprise network 104.

In some embodiments, the communication sessions between communication devices 108 (which may also be referred to herein as UAs) may be direct or may be facilitated by one or more internal conference resources 136 of the enterprise network 104. In particular, the internal conference resource(s) 136 may be used to support communication sessions that involve three or more UAs. Whether the communication session involves the conference resource(s) 136 or not, the communication session may be established in accordance with protocols described in RFC 3261 and/or 4579. Accordingly, control signaling for the communication session may be separated from the media stream, which may correspond to a Real-time Transport Protocol (RTP) or Secure RTP (SRTP) media stream. The media stream for a two-UA communication session may be established directly between the UAs whereas the media stream for a communication session having three or more UAs may be routed through the internal conference resource(s) 136.

In other words, the conference resource(s) 136 may comprise a conference bridge or conference server that includes the various types of conference hardware and/or software needed to mix multiple media streams from multiple different UAs. The conference resource(s) 136 may allow various users (whether enterprise users or non-enterprise users) to lease, borrow, or otherwise temporarily use parts of the conferencing resources to engage in conference calls with one another. As can be appreciated, while concepts of the present disclosure will be discussed primarily in connection with conference calls, embodiments of the present disclosure are not so limited. In particular, concepts described herein may be applied to one or more of audio-based conference calls, video-based conference calls, multimedia conferences, web conferences, etc. The types of resources provided by in the conference resource(s) 136 may depend upon the type and/or size of conference. In some embodiments, the conference resource(s) 136 may be capable of facilitating conferences of one or more media types for two, three, four, five, . . . , one hundred, etc. participants. More specifically, the internal conference resource(s) 136 may comprise the functionality to operate as a conference focus in accordance with RFC 4579.

In some embodiments, the communication server 112 may be used to help establish communication sessions and/or move signaling paths, change call topology, etc. of in-progress communication sessions. Specifically, the communication server 112 may include a Private Branch eXchange (PBX), an enterprise switch, an enterprise server, combinations thereof, or other type of telecommunications system switch or server. The communications server 112 is, in some embodiments, configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 112 is depicted in FIG. 1, two or more communications servers 112 may be provided in a single enterprise network 104 or across multiple separate LANs 140 owned and operated by a single enterprise, but separated by an untrusted communication network. In configurations where an enterprise or an enterprise network 104 includes two or more communications servers 112, each server 112 may comprise similar functionality, but may be provisioned for providing its features to only a subset of all enterprise users. In particular, a first communications server 112 may be authoritative for and service a first subset of enterprise users whereas a second communications server 112 may be authoritative for and service a second subset of enterprise users, where the first and second subsets of users generally do not share a common user.

Additionally, multiple servers 112 can support a common user community. For example, in geo-redundant and other applications where users aren't necessarily bound to a single application server, there may be a cluster of equivalent servers where a user can be serviced by any server in the cluster.

A communications server 112 can be configured to include user communication preferences, which map, for a corresponding (enterprise subscriber) user, a set of communication preferences to be invoked for an incoming and/or outgoing contact for each user for whom it is authoritative. Even more specifically, communications between internal enterprise users (e.g., internal communication devices 108) may first be serviced by the originating user's authoritative communications server 112 during the origination phase of communications set-up. After the origination phase is complete, the authoritative communications server 112 of the terminating (or called) user may be invoked to complete the termination phase of communications set-up. In some embodiments, the communications server 112 for the originating and terminating user may be the same, but this is not necessarily required. In situations where more than two enterprise users are involved in a communication session, authoritative communications servers 112 for each of the involved users may be employed without departing from the scope of the present invention. Additionally, the authoritative communications servers 112 for each user may be in the same enterprise network 104 or in different enterprise networks 104, which are owned by a common enterprise but are separated by an untrusted communication network.

As discussed above, the communication sever 112 may include a feature sequencer that is configured to instantiate the communication preferences 116 for a calling and called user. In some embodiments, the user communication preferences 116 may be provisioned by users and/or by administrative personnel. The communications preferences for a particular user are referenced by the feature sequencer functionality of the communication server to determine which, if any, features should be incorporated into a communication session for the user. The feature sequencer functionality can actually provide communication features directly into the communication session or the feature sequencer functionality can determine an application sequence which will be invoked during set-up and used during the communication session.

In accordance with at least some embodiments, the communication server 112 can determine an application sequence and cause one or more applications 120, 124 to be sequenced into a communication session. In particular, the communication server 112 is configured to analyze a particular user's communication preferences as defined in the user communication preferences 116 and invoke the necessary applications 120, 124 to fulfill such preferences. Once an application sequence is determined for a calling and/or called user, the communications server 112 passes the communication-establishing message (e.g., an INVITE message) to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the communication server 112 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only two application servers 120 are depicted, one skilled in the art will appreciate the one, two, three, or more applications servers 120 can be provided and each server may be configured to provide a single application or a set of applications 124. The applications provided by a particular application server 120 may vary depending upon the capabilities of the server 120 and in the event that a particular application server 120 comprises a set of applications 123, one, some, or all of the applications in that set of applications 124 may be included in a particular application sequence. There is no requirement, however, that all applications in a set of applications 124 be included in an application sequence and there is no requirement as to the order in which applications are included in the application sequence. Rather, the application sequence is usually determined based on a user's communication preferences, which can be found in the user communication preferences table 116. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-party communications (e.g., conference call) are established and conducted and these preferences may vary depending upon whether the multi-party communication is established initially or whether it is established on an ad-hoc basis.

The applications included in a particular application sequence are generally included to accommodate the user's preferences. Applications may vary according to media-type, function, and the like. Exemplary types of applications include, without limitation, an EC-500 (extension to cellular) application, a call-setup application, a call-recording application, a dynamic device pairing application, a voice-mail application, an email application, a voice application, a video application, a text application, a conferencing application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

In some embodiments, when the communication server 112 includes one or more applications 120, 124 in a communication session, those applications may be configured to behave as a B2BUA. When an application, or any other communication element, behaves as a B2BUA, the application inserts itself in the control signaling path so that it can maintain complete call state and participate in all call requests. A downside to this behavior is that if the B2BUA were involved in a communication session that involved the internal conference resource(s) 136, the B2BUA would hide the existence and identity of the conference resource(s) 136 from the UAs involved in the communication session. If all communication elements were operating in strict adherence with the SIP standards, this would preclude the UA from creating ad-hoc conferences or subscribing to conference state events. Mechanisms for overcoming this unfortunately side-effect are proposed herein by altering the behavior of the internal conference resource(s) 136, the B2BUAs, and/or the UAs, while still maintaining compliance with SIP standards.

In addition to the communication server 112, applications servers 120, and internal conference resource(s) 136, the enterprise network 104 may also comprise other servers 128 and an enterprise database 132. The other servers 128 may include any other type of server or switch needed for operating the enterprise network 104. Examples of suitable other servers 128 include, without limitation, presence servers, Instant Messaging (IM) servers, email servers, voice-mail servers, virtual machines, web servers, call center servers, Interactive Voice Response (IVR) units, etc.

The enterprise database 132 may include information regarding enterprise users. Specifically, the enterprise database 132 may comprise information that identifies enterprise users, their relative position within the enterprise hierarchy, network permissions, communication permissions, etc. The enterprise database 132 may be any type of data storage system and may include one or more hierarchical databases, relational databases, or any other type of known database structure such as a SQL database. The enterprise database 132, although depicted as being separate from the user communication preferences 116 in the communication server 112, may comprise the data regarding user communication preferences 116 and may be accessible to the communication server 112 via a database lookup or query/response protocol.

It should be appreciated that some or all of the functions depicted in FIG. 1 may be co-hosted and/or co-resident on a single server. The depiction of components in FIG. 1 is generally intended to be a logical depiction of the components of the system 100.

Figure 2:
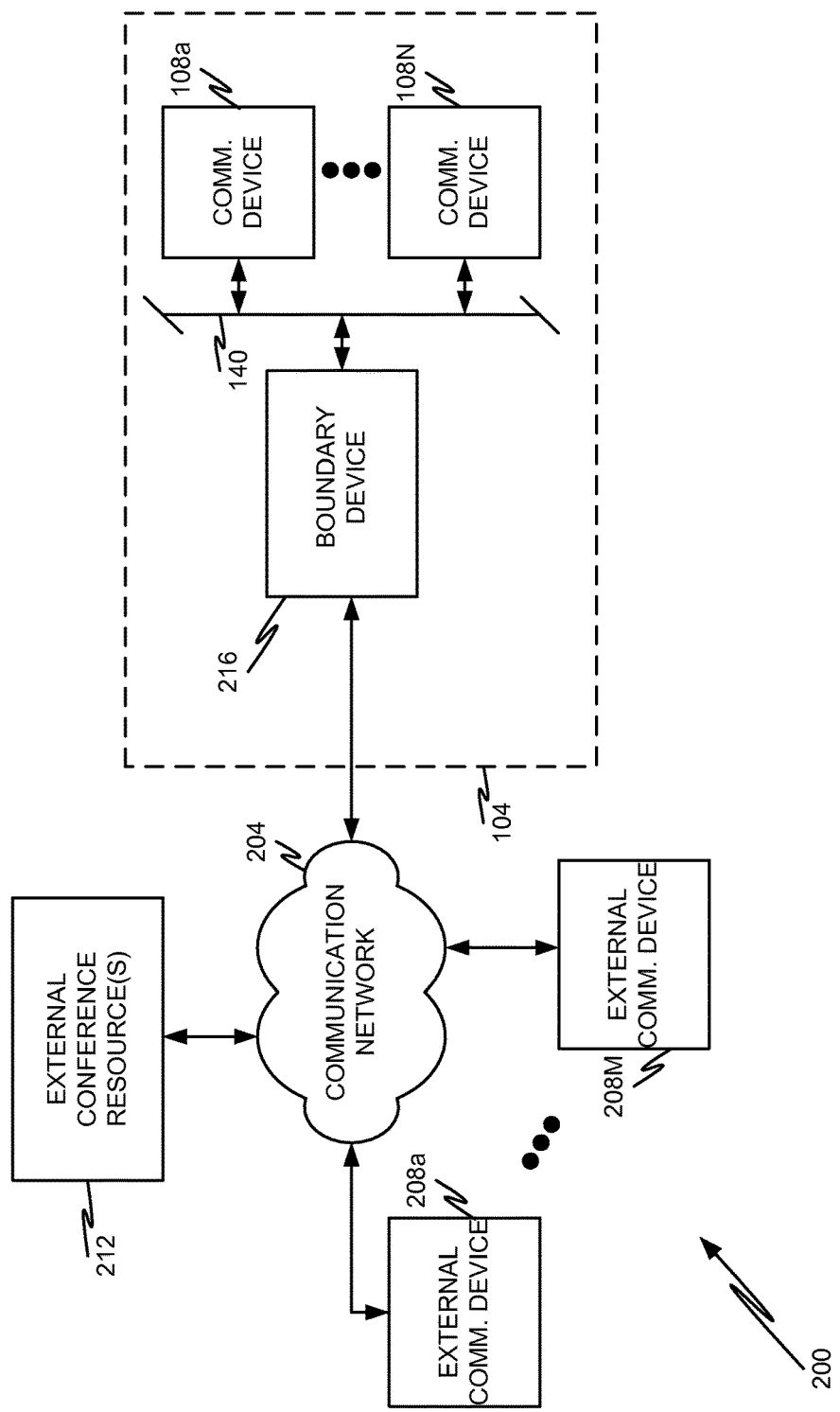
FIG. 2 is a block diagram of a second communication system in accordance with embodiments of the present disclosure.

With reference now to FIG. 2, another communication system 200 will be described in accordance with embodiments o the present disclosure. The communication system 200 may comprise one or more enterprise networks 104 that are connected to an untrusted/unsecure communication network 204.

The communication network 204 may be packet-switched and/or circuit-switched. An exemplary communication network 204 includes, without limitation, a WAN, such as the Internet, a Public Switched Telephone Network (PSTN), a Plain Old Telephone Service (POTS) network, a cellular communications network, or combinations thereof. In one configuration, the communication network 204 is a public network supporting the TCP/IP suite of protocols.

The communication network 204 may be used to connect one or more external communication devices 208a-M to one another and/or to communication devices 108a-N within the enterprise network 104 (e.g., internal communication devices). Both the internal and external communication devices may be referred to herein as UAs without departing from the scope of the present disclosure.

The external communication devices 208a-M are generally referred to as "external" because they are either not under the direct control of the enterprise administering the enterprise network 104 or have a decreased level of trust with the enterprise network 104 as compared with communication devices 108a-N that are within the enterprise network 104. Exemplary types of external communication devices 208a-M include, without limitation, cellular phones, laptops, Personal Computers (PCs), Personal Digital Assistants (PDAs), digital phones, analog phones, and the like. The communication devices 108a-N and 208a-M may correspond to any collection of components (hardware and software) that enable users to exchange media (e.g., voice, video, etc.), data (e.g., emails, Short Message Service (SMS) messages, Multimedia Message Service (MMS) messages, files, presentations, documents, etc.) with one another's communication devices over the communication network 204 and/or within the enterprise network 104.

The communication system 200 may further include conference resource(s) 212 that are external to the enterprise network 104. The external conference resource(s) 212 may be similar or identical to the internal conference resource(s) 136 except that that are not within an enterprise network 104 with a communication device 108a-N. Rather, the communication devices 108a-N may be separated from the external conference resource(s) 212 via a network boundary device 216. In some embodiments, the network boundary device 216 operates to secure the enterprise network 104 from malicious attacks from the communication network 204. Examples of a network boundary device 216 include, without limitation, a Session Border Controller (SBC), a gateway, a Network Address Translation (NAT) device, a firewall, a router, or any other collection of hardware and/or software that performs one or more functions such as filtering, protocol translation/mapping, impedance matching, rate conversion, fault isolation, signal translation, encryption, packet tunneling, etc. as necessary to provide interoperability and/or security for the enterprise network 104.

Figure 3:
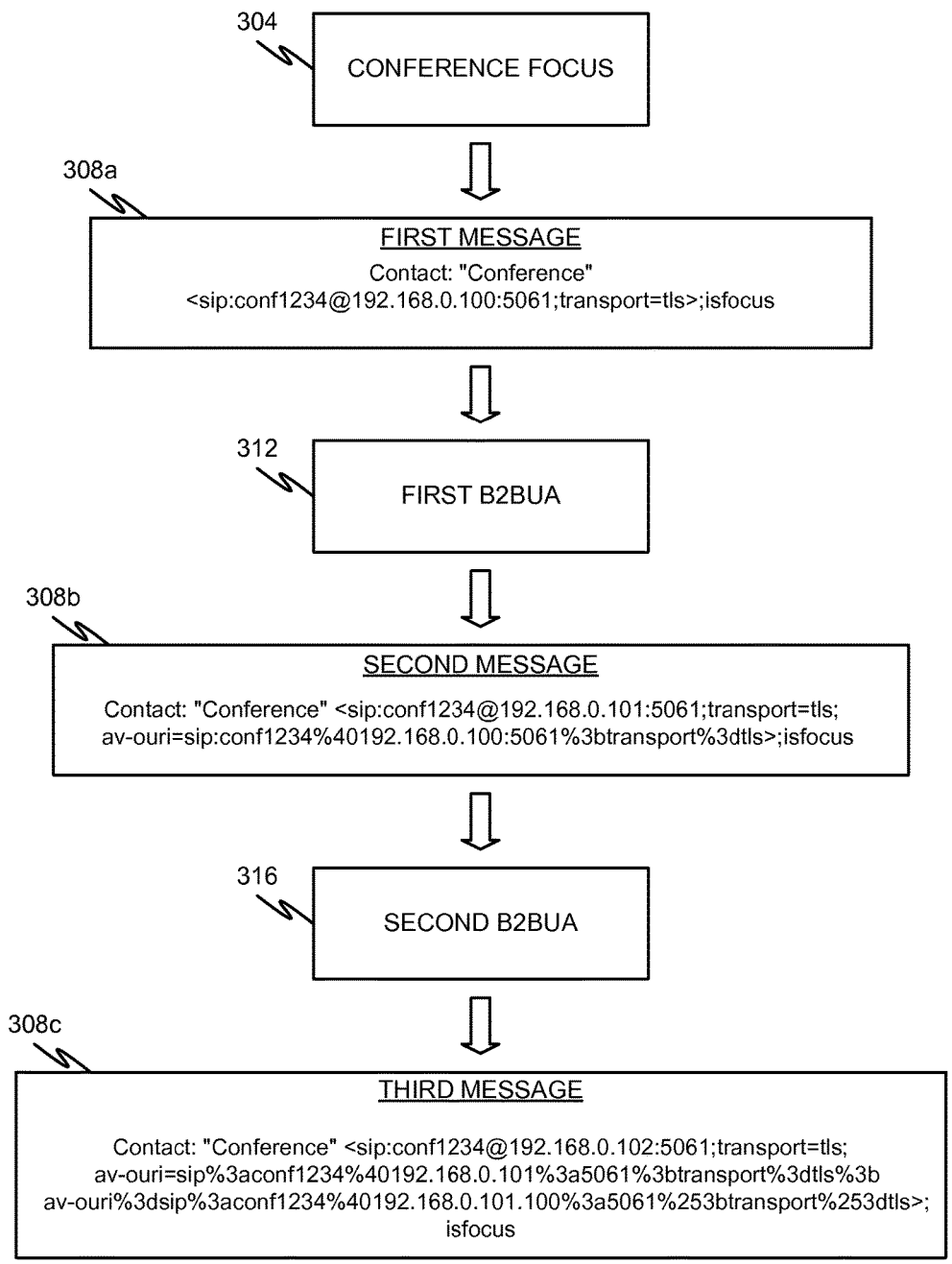
FIG. 3 is a block diagram depicting message flows from a conference focus through multiple B2BUAs in accordance with embodiments of the present disclosure.

With reference now to FIG. 3, one example of a message flow will be described in accordance with at least some embodiments of the present disclosure. Initially, a first message 308a is generated and transmitted by a conference focus 304. The conference focus 304 may correspond to either the internal conference resource(s) 136 or the external conference resource(s) 212 and may be a conference focus as described in RFC 4579. The contents of the first message may or may not be obfuscated depending upon whether the conference focus 304 is separated from the first B2BUA 312 by one or more boundary devices 216.

As can be seen in FIG. 3, the first message 308a may comprise a contact header parameter value or flag that indicates the first message 308a was generated by and is originating from a conference focus 304. The example of FIG. 3 uses a parameter value of "isfocus" in the contact header of the first message 308a.

Upon detecting this flag or parameter value, the first B2BUA 312 knows that the first message 308a has come from a conference focus 304 and the Contact URI of the conference focus 304 should be preserved. In some embodiments, the first B2BUA 312 preserves the Contact URI of the conference focus 304 by taking the original Contact URI (e.g., the Contact URI of the conference focus 304) and embedding that value in a second message 308b that is transmitted by the first B2BUA 312. Even more specifically, the first B2BUA 312 may take the original Contact URI from the first message 308a and embed it in an "originalFocusURI" or "avouri" parameter of the second message 308b as a URI parameter. The first B2BUA 312 may also preserve the isfocus parameter between the first message 308a and second message 308b.

When the second message 308b is received at the second B2BUA 316 (assuming a second B2BUA is involved in the communication session), the second B2BUA 316 may repeat the process that was previously performed by the first B2BUA 312. Specifically, the second B2BUA 316 may determine that the second message contains the isfocus parameter and in response to making such a determination, the second B2BUA 316 may take the current Contact URI (e.g., the Contact URI of the first B2BUA 312) and embed it in the originalFocusURI or avouri of a third message 308c along with the already-embedded Contact URI of the conference focus 304. This creates a third message 308c that has preserved the Contact URI of both the conference focus 304 and the first B2BUA 312. The third message 308c may also preserve the isfocus parameter to indicate to the next B2BUA, if existent, that the message being transmitted is associated with a conference resource such as the conference focus 304.

If a UA desires to create an ad-hoc conference, subscribe to conference state events, alter an existing conference topology (e.g., add, remove, change, etc.) the conference participants from the group of current participants to a different group of conference participants, then the UA is able to determine the Contact URI of the conference focus 304 because that information has been preserved even though the messages traveling from the conference focus 304 to the UA have traversed one or more B2BUAs.

Figure 4:
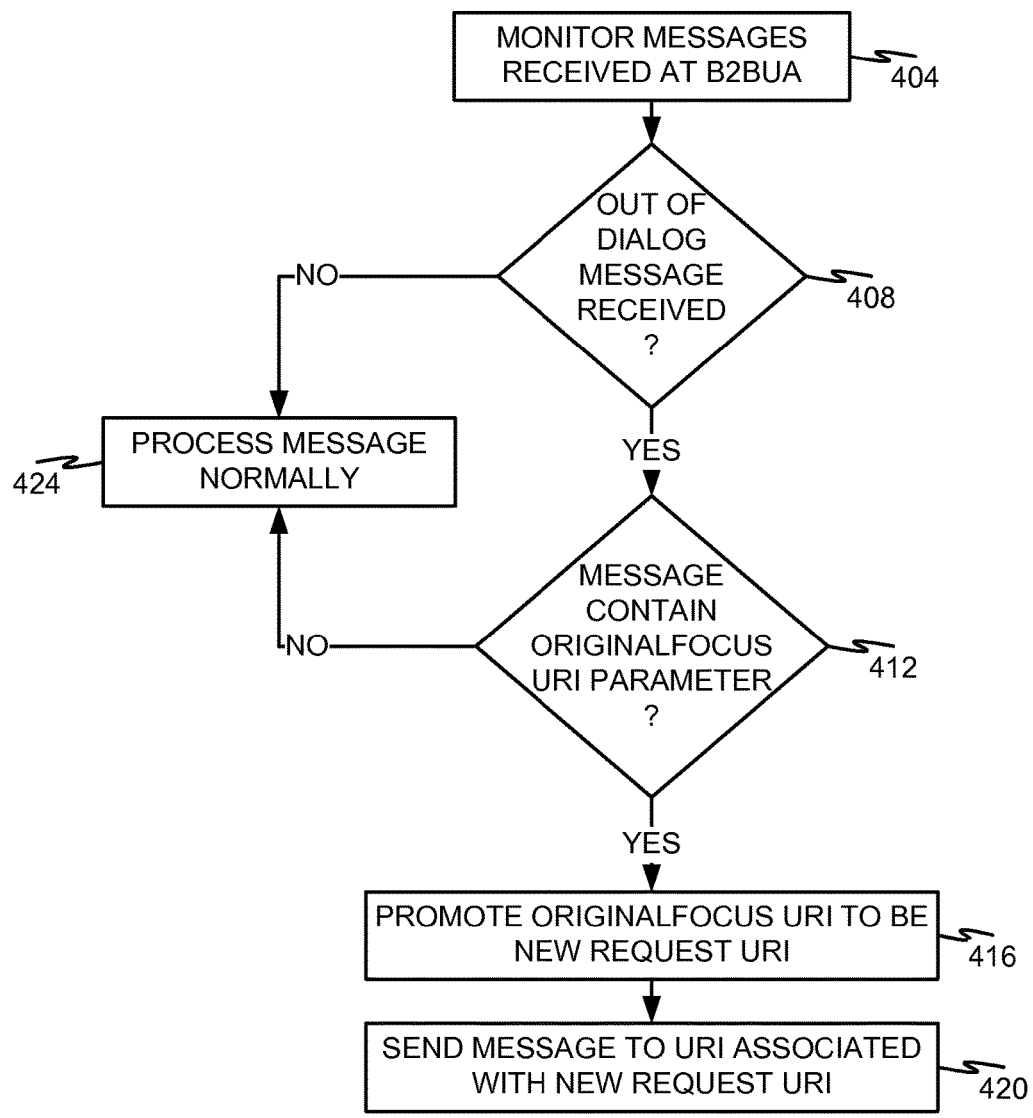
FIG. 4 is a flow diagram depicting a communication method in accordance with embodiments of the present disclosure.

Specifically, a UA may be enabled to generate and send an out-of-dialog message (e.g., SUBSCRIBE, REFER, etc.) toward the conference focus 304 because it is aware of the Contact URI of the conference focus 304. More specifically, FIG. 4 depicts a method of operating a B2BUA when such an out-of-dialog message is received. The method of FIG. 4 begins with the B2BUA monitoring messages received thereby (step 404). If the received message does not correspond to an out-of-dialog message (step 408) or does not have an originalFocusURI parameter (step 412), then the B2BUA will process the message in a normal fashion 424.

If, however, the message received at the B2BUA is an out-of-dialog message and does contain an originalFocusURI parameter, then the B2BUA will promote or un-nest the originalFocusURI to be the new Request URI (step 416) and then will send the message to the URI associated with or identified by the new Request URI (step 420). More particularly, the process of promoting or un-nesting the next URI from the embedded originalFocusURI parameter may comprise "un-escaping" that parameter. When doing the initial embedding, any special characters in the URI are "escaped" with a percent sign and an ASCII code. When promoting the URI, those special characters are restored. This process will naturally "promote" a nested originalFocusURI parameter to be a first level parameter. The value extracted from the URI parameter corresponds to the next URI (corresponding to the URI of the B2BUA that is next-closest to the conference focus 304 or perhaps to the URI of the conference focus 304).

By employing the above-described mechanisms, it is possible to enable a UA to subscribe to conference state events and/or change conference topology even though the UA is communicating with an RFC 4579 conference focus in a B2BUA environment.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   receiving, by a microprocessor via a communication network, a first message;
   determining, by the microprocessor, that the first message is associated with a conference focus and the first message contains a Session Initiation Protocol (SIP) isfocus parameter, wherein the conference focus is a conference bridge;
   in response to determining that the first message is associated with the conference focus and the first message contains the Session Initiation Protocol (SIP) isfocus parameter, extracting, by the microprocessor, a first Contact URI of the conference bridge from the first message;
   generating, by the microprocessor, a second message that contains the first Contact URI of the conference bridge added as a first different contact URI parameter in the second message; and
   transmitting, by the microprocessor via the communication network, the second message that contains the first Contact URI of the conference bridge added as a first different contact URI parameter.

2. The method of claim 1, wherein the first message is received at a first Back-to-Back User Agent (B2BUA) and wherein the first B2BUA generates the second message.

3. The method of claim 2, wherein the first and second message both comprise a parameter value that indicates an association with the conference focus and wherein the first B2BUA transmits the second message to a second B2BUA, the method further comprising:
   determining, by the second B2BUA, that the second message comprises the parameter value that indicates an association with the conference focus;
   in response to determining that the second message is associated with the conference focus, extracting, by the second B2BUA, a second Contact URI from the second message, the second Contact URI corresponding to a Contact URI of the first B2BUA; and
   generating a third message that contains the second Contact URI added with the first Contact URI of the conference bridge as a second different contact URI parameter in the third message.

4. The method of claim 3, wherein the third message further comprises the parameter value that indicates an association with the conference focus.

5. The method of claim 4, wherein the contact URI parameter is at least one of encrypted and obfuscated.

6. The method of claim 1, wherein the first Contact URI of the conference bridge corresponds to a URI of the conference focus and wherein the contact header parameter comprises a URI parameter.

7. The method of claim 1, wherein the conference focus operates in accordance with RFC 4579.

8. The method of claim 1, wherein the first message is a SIP request.

9. The method of claim 1, wherein the first message is a SIP response.

10. A non-transitory computer-readable medium comprising processor-executable instructions that, when executed by a processor, perform the method of claim 1.

11. The method of claim 1, wherein the first Contact URI of the conference bridge is a SIP original Contact URI and wherein the different Contact URI parameter in the second message is a SIP originalFocusURI.

12. A system, comprising:
   a memory,
   a microprocessor in communication with the memory, wherein the microprocessor executes a software module, the software module comprising:
      a first Back-to-Back User Agent (B2BUA) that receives a first message via a communication network, determines that the first message is associated with a conference focus and the first message contains a Session Initiation Protocol (SIP) isfocus parameter, wherein the conference focus is a conference bridge, in response to determining that the first message is associated with a conference focus and the first message contains the Session Initiation Protocol (SIP) isfocus parameter, extracts a first Contact URI of the conference bridge from the first message, generates a second message that contains the first Contact URI of the conference bridge added as a first different contact URI parameter in the second message; and transmits the second message that contains the first Contact URI of the conference bridge added as a first different contact URI parameter.

13. The system of claim 12, wherein the second message is transmitted from the first B2BUA to at least one of a second B2BUA and a User Agent (UA).

14. The system of claim 13, wherein the first and second message both comprise a parameter value that indicates an association with the conference focus and wherein the first B2BUA transmits the second message to a second B2BUA, and wherein:
   the second B2BUA determines that the second message comprises the parameter value that indicates an association with the conference focus, in response to determining that the second message is associated with the conference focus, extracts a second Contact URI from the second message, the second Contact URI corresponding to a Contact URI of the first B2BUA, and generates a third message that contains the second Contact URI added with the first Contact URI of the conference bridge as a second different contact URI parameter of the third message.

15. The system of claim 14, wherein the third message further comprises the parameter value that indicates an association with the conference focus.

16. The system of claim 15, wherein the contact URI parameter is at least one of encrypted and obfuscated.

17. The system of claim 12, wherein the first Contact URI of the conference bridge corresponds to a URI of the conference focus and wherein the contact header parameter comprises a URI parameter.

18. The system of claim 12, wherein the conference focus operates in accordance with RFC 4579.

19. The method of claim 11, wherein a User Agent (UA) uses the SIP originalFocusURI in a SIP SUBSCRIBE or SIP REFER message.

20. The method of claim 1, wherein the first message is from the conference bridge.

* * * * *